United States Patent
Tang

(10) Patent No.: US 10,681,685 B2
(45) Date of Patent: Jun. 9, 2020

(54) RESOURCE INDICATION METHOD, BASE STATION AND TERMINAL

(71) Applicant: GUANGDONG OPPO MOBILE TELECOMMUNICATIONS CORP., LTD., Dongguan, Guangdong (CN)

(72) Inventor: Hai Tang, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 40 days.

(21) Appl. No.: 15/737,632

(22) PCT Filed: Oct. 31, 2015

(86) PCT No.: PCT/CN2015/093480
§ 371 (c)(1),
(2) Date: Dec. 18, 2017

(87) PCT Pub. No.: WO2017/070962
PCT Pub. Date: May 4, 2017

(65) Prior Publication Data
US 2018/0176894 A1  Jun. 21, 2018

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0032* (2013.01); *H04L 5/143* (2013.01);
(Continued)

(58) Field of Classification Search
None
See application file for complete search history.

(56) References Cited

U.S. PATENT DOCUMENTS

| 8,520,619 B2 | 8/2013 | Hong |
| 2013/0039284 A1 | 2/2013 | Marinier |
(Continued)

FOREIGN PATENT DOCUMENTS

| CN | 1996791 A | 7/2007 |
| CN | 101076139 B | 10/2010 |
(Continued)

OTHER PUBLICATIONS

Texas Instruments: "Outstanding aspects of PUCCH resource allocation for EPDCCH", 3GPP Draft R1-124746 Outstanding Aspects of PUCCH Resource Allocation for EPDCCH V1, 3rd Generation Partnership Project (3GPP). Mobile Competence Centre; 650, Route Des Lucioles; F-06921 SOPHIA-ANT, vol. RAN WG1, No. New Orleans. USA; 20121112-20121116 Nov. 3, 2012 (Nov. 3, 2012), XP050662762, Retrieved from the Internet: URL: http://www.3gpp.org/ftp/tsg_ran/WG1_RL1/.

(Continued)

*Primary Examiner* — Christine T Duong

(57) ABSTRACT

A resource indication method, a base station and a terminal are provided. The method includes that: the base station generates a resource indication channel, the resource indication channel indicating a first time-frequency resource and a communication parameters for the first time-frequency resource, the resource indication channel occupying a second time-frequency resource and at least one first time-frequency resource corresponding to at least one resource indication channel forming a cell; and the base station sends the resource indication channel to the terminal. The method can improve resource allocation and indication flexibility, and improve performance and applicability of a wireless communication system.

42 Claims, 17 Drawing Sheets

(51) Int. Cl.
    *H04L 5/14* (2006.01)
    *H04W 88/06* (2009.01)

(52) U.S. Cl.
    CPC ......... *H04W 72/04* (2013.01); *H04W 72/048* (2013.01); *H04W 72/0446* (2013.01); *H04W 72/0453* (2013.01); *H04W 88/06* (2013.01)

(56) References Cited

U.S. PATENT DOCUMENTS

| | | | |
|---|---|---|---|
| 2013/0242882 A1 | 9/2013 | Blankenship | |
| 2013/0294389 A1* | 11/2013 | Hong | H04L 5/0053 370/329 |
| 2014/0010169 A1 | 1/2014 | Novak | |
| 2015/0036642 A1* | 2/2015 | Ji | H04L 5/0048 370/329 |
| 2015/0181572 A1 | 6/2015 | Guo et al. | |
| 2015/0215148 A1* | 7/2015 | Taori | H04L 27/2626 370/329 |
| 2015/0222403 A1* | 8/2015 | Kim | H04L 27/2613 370/329 |
| 2015/0341908 A1 | 11/2015 | Wang et al. | |
| 2016/0029333 A1 | 1/2016 | Seo et al. | |
| 2016/0308637 A1* | 10/2016 | Frenne | H04J 11/0069 |
| 2018/0020462 A1* | 1/2018 | Xiong | H04W 72/1215 |
| 2018/0199341 A1* | 7/2018 | Baldemair | H04L 27/264 |
| 2018/0206237 A1* | 7/2018 | Koorapaty | H04L 5/001 |

FOREIGN PATENT DOCUMENTS

| | | |
|---|---|---|
| CN | 102740408 A | 10/2012 |
| CN | 102917448 A | 2/2013 |
| CN | 103298117 A | 9/2013 |
| CN | 104469785 A | 3/2015 |
| EP | 2741547 A1 | 6/2014 |
| EP | 2866507 A1 | 4/2015 |
| EP | 2919407 A1 | 9/2015 |
| EP | 2975792 A1 | 1/2016 |
| JP | 2006352379 A | 12/2006 |
| JP | 2008124832 A | 5/2008 |
| JP | 2013013115 A | 1/2013 |
| JP | 2013527663 A | 6/2013 |
| JP | 2014003701 A | 1/2014 |
| WO | 2012126081 A1 | 9/2012 |
| WO | 2014101810 A1 | 7/2014 |
| WO | 2014142505 A1 | 9/2014 |
| WO | 2015061935 A1 | 5/2015 |
| WO | 2015080646 A1 | 6/2015 |

OTHER PUBLICATIONS

Supplementary European Search Report in European application No. 15907023.4, dated Dec. 21, 2018.
English Translation of the Written Opinion of the International Search Authority in international application No. PCT/CN2015/093480, dated Aug. 5, 2016.
International Search Report in international application No. PCT/CN2015/093480, dated Aug. 5, 2016.
Written Opinion of the International Search Authority in international application No. PCT/CN2015/093480, dated Aug. 5, 2016.
Okubo, et al., "General radio system outline of LTE to realize high speed, large capacity, low delay," NTT DOCOMO Technical Journal Apr., p. 11-19, Apr.,, and p. 3 vol. 19 No. 1,2011.
First Office Action of the Japanese application No. 2018-505630, dated May 31, 2019.
Second Office Action of the Japanese application No. 2018-505630, dated Feb. 4, 2020.
First Office Action of the Indian application No. 201817005316, dated Mar. 3, 2020.

* cited by examiner

200

| A base station generates a resource indication channel, the resource indication channel indicating a first time-frequency resource and a communication parameter for using the first time-frequency resource, the resource indication channel occupying a second time-frequency resource and at least one first time-frequency resource corresponding to at least one resource indication channel forming a cell | S210 |

| The base station sends the resource indication channel to a terminal | S220 |

```
┌─────────────────────────────────────────────────────────────┐
│ A terminal receives a resource indication channel sent by a │
│ base station, the resource indication channel indicating a  │
│ first time-frequency resource and a communication parameter │──S310
│ for using the first time-frequency resource, the resource   │
│ indication channel occupying a second time-frequency        │
│ resource and at least one first time-frequency resource     │
│ corresponding to at least one resource indication channel   │
│ forming a cell                                              │
└─────────────────────────────────────────────────────────────┘
                              │
┌─────────────────────────────────────────────────────────────┐
│ The terminal determines the first time-frequency resource   │
│ and the communication parameter for the first time-         │──S320
│ frequency resource according to the resource indication     │
│ channel                                                     │
└─────────────────────────────────────────────────────────────┘
```

FIG. 5

RESOURCE INDICATION METHOD, BASE STATION AND TERMINAL

RELATED APPLICATION

This application is an application under 35 U.S.C. 371 of International Application No. PCT/CN2015/093480 filed on Oct. 31, 2015, the entire contents of which are incorporated herein by reference.

TECHNICAL FIELD

Embodiments of the disclosure relate to the field of communications, and more particularly to a resource indication method, a base station and a terminal.

BACKGROUND

An existing wireless communication system, for example, a Global System of Mobile Communication (GSM), a Code Division Multiple Access (CDMA) 2000 system, a Wideband Code Division Multiple Access (WCDMA) system and a Long Term Evolution (LTE) system, usually uses fixed communication parameters, or a very limited small number of communication parameters are variable, for example, a carrier bandwidth, a timeslot length or a subframe length, a spreading factor of a CDMA system, a subcarrier spacing of the LTE system and a physical resource block granularity.

However, there are ever-changing application manners required to be supported in a next-generation wireless communication system (for example, a 5th-Generation (5G) system). Therefore, it is necessary to efficiently deal with large-range changes in indexes of a bandwidth, a delay, mobility, coverage, a communication rate, reliability, a user number and the like. In an existing system, resource allocation, communication parameters corresponding to resources and corresponding resource indication solutions are relatively undiversified and unlikely to meet the requirement of the next-generation wireless communication system.

SUMMARY

The embodiments of the disclosure provide a resource indication method, a base station and a terminal, which may improve resource allocation and indication flexibility and may improve performance and applicability of a wireless communication system.

A first aspect provides a resource indication method, which may include that:

a base station generates a resource indication channel, the resource indication channel being configured to indicate a first time-frequency resource and communication parameters for using the first time-frequency resource, the resource indication channel occupying a second time-frequency resource and at least one first time-frequency resource corresponding to at least one resource indication channel forming a cell; and the base station sends the resource indication channel to a terminal.

In a possible implementation mode of the first aspect, the operation that the base station sends the resource indication channel to the terminal may include that:

the base station sends the resource indication channel to the terminal after modulating the resource indication channel in a modulation manner preset by a system.

In a possible implementation mode of the first aspect, the operation that the base station sends the resource indication channel to the terminal may include that:

the base station sends the resource indication channel to the terminal after performing multi-antenna transmit diversity on the resource indication channel.

In a possible implementation mode of the first aspect, the operation that the base station sends the resource indication channel to the terminal may include that:

the base station sends the resource indication channel to the terminal in a single-carrier manner.

Relatively basic parameters are used for sending when the resource indication channel is sent by the abovementioned measures, so that detection complexity of the terminal may be reduced, the terminal may quickly and accurately find and demodulate the resource indication channel, and system efficiency may be improved.

In a possible implementation mode of the first aspect, the resource indication channel may include information indicating that the resource indication channel is a last resource indication channel of the cell to enable the terminal to timely stop searching for another resource indication channel, so that performance and efficiency of the system may be improved.

In another possible implementation mode of the first aspect, the resource indication channel may include a time range and a frequency range indicating a next resource indication channel in the cell to enable the terminal to quickly find the next resource indication channel, so that the performance and efficiency of the system may be improved.

In a possible implementation mode of the first aspect, before the operation that the base station sends the resource indication channel to the terminal, the method may further include that: the base station sets a guard band for the resource indication channel. For the condition that the resource indication channel is located on an edge of a total available band, an out-of-band radiation index should be consistent with a local supervision requirement. For the condition that the resource indication channel is located in a system band, the out-of-band radiation index should be consistent with an in-band mutual interference requirement.

A second aspect provides a resource indication method, which may include that:

a terminal receives a resource indication channel sent by a base station, the resource indication channel indicating a first time-frequency resource and communication parameters for using the first time-frequency resource, the resource indication channel occupying a second time-frequency resource and at least one first time-frequency resource corresponding to at least one resource indication channel forming a cell; and the terminal determines the first time-frequency resource and the communication parameters for using the first time-frequency resource according to the resource indication channel.

In a possible implementation mode of the second aspect, the method may further include that:

the terminal performs synchronization with the base station according to a characteristic sequence.

In a possible implementation mode of the second aspect, before the operation that the terminal determines the first time-frequency resource and the communication parameters for using the first time-frequency resource according to the resource indication channel, the method may further include that:

the terminal demodulates the resource indication channel in a modulation manner preset by a system.

In a possible implementation mode of the second aspect, the operation that the terminal receives the resource indication channel sent by the base station may include that:

the terminal receives the resource indication channel sent by the base station in a single-carrier manner.

In a possible implementation mode of the second aspect, the operation that the terminal receives the resource indication channel sent by the base station may include that:

the terminal receives the resource indication channel sent by the base station through multi-antenna transmit diversity.

In a possible implementation mode of the second aspect, the resource indication channel may include information indicating that the resource indication channel is a last resource indication channel of the cell.

In a possible implementation mode of the second aspect, the resource indication channel may include a time range and a frequency range indicating a next resource indication channel in the cell.

In a possible implementation mode of the second aspect, a guard band may be set for the resource indication channel.

A third aspect provides a base station, which may include a generation module and a sending module, configured to execute corresponding implementation modes of the first aspect and the second aspect. The base station may further include a processing module configured to execute corresponding implementation modes.

A fourth aspect provides a base station, which may include a processor, a transceiver and a memory, configured to execute corresponding implementation modes of the first aspect and the second aspect. Each device of the base station of the fourth aspect may correspond to a corresponding module of a base station of the third aspect.

A fifth aspect provides a terminal, which may include a receiving module and a processing module, configured to execute corresponding implementation modes of the first aspect and the second aspect.

A sixth aspect provides a terminal, which may include a processor, a transceiver and a memory, configured to execute corresponding implementation modes of the first aspect and the second aspect. Each device of the terminal of the sixth aspect may correspond to a corresponding module of a terminal of the fifth aspect.

In the first aspect to the sixth aspect and the corresponding implementation modes, a time-frequency range occupied by the second time-frequency resource may be within a time-frequency range occupied by the first time-frequency resource.

It should be understood that the second time-frequency resource may include at least one time-frequency unit, a time range corresponding to a first time-frequency unit in the at least one time-frequency unit is a time point set by the system, a frequency range corresponding to the first time-frequency unit is a frequency raster set by the system, and when the second time-frequency resource includes multiple time-frequency units, the first time-frequency unit includes information indicating indicating that the resource indication channel is extended to occupy the time-frequency units of the second time-frequency resource.

The communication parameters may include at least one of a multiple access technology used for the first time-frequency resource, a duplex manner used for the first time-frequency resource, a communication mode used for the first time-frequency resource and basic physical parameters corresponding to the multiple access technology used for the first time-frequency resource.

The communication parameters may include a cell Identity (ID).

The communication parameters may include control channel information carried in the first time-frequency resource.

The control channel information may include at least one of Broadcast Channel (BCH) information, Master Information Block (MIB) information, a Paging Channel (PCH), downlink common control channel information, downlink dedicated control channel information, self-contained mode information, uplink random access channel information and uplink control channel information.

The resource indication channel may include the characteristic sequence, and the characteristic sequence may be configured to indicate that the current channel is a resource indication channel.

The characteristic sequence may further be configured for synchronizing the base station with the terminal.

The cell may include multiple first time-frequency resources corresponding to multiple resource indication channels, and the multiple first time-frequency resources are not completely the same in terms of at least one of time ranges and frequency ranges.

The resource indication channel may be configured to indicate that the first time-frequency resource is not used.

On the basis of the technical solutions, according to the resource indication method, the base station and the terminal of the embodiments of the disclosure, the base station generates and sends the resource indication channel, wherein the resource indication channel is configured to indicate the time-frequency resource and the communication parameters for using the time-frequency resource, and the at least one time-frequency resource corresponding to the at least one resource indication channel forms the cell, so that resource allocation and indication flexibility is improved, and performance and applicability of a wireless communication system can be improved.

BRIEF DESCRIPTION OF DRAWINGS

In order to describe the technical solutions of the embodiments of the disclosure more clearly, the drawings required to be used for descriptions about the embodiments or a related art will be simply introduced below. Obviously, the drawings described below are only some embodiments of the disclosure. For those skilled in the art, other drawings may further be obtained according to these drawings without creative work.

FIG. 4 is a schematic flowchart of a resource indication method according to another embodiment of the disclosure.

FIG. 5 is a schematic flowchart of a resource indication method according to another embodiment of the disclosure.

DETAILED DESCRIPTION

Figure 1:
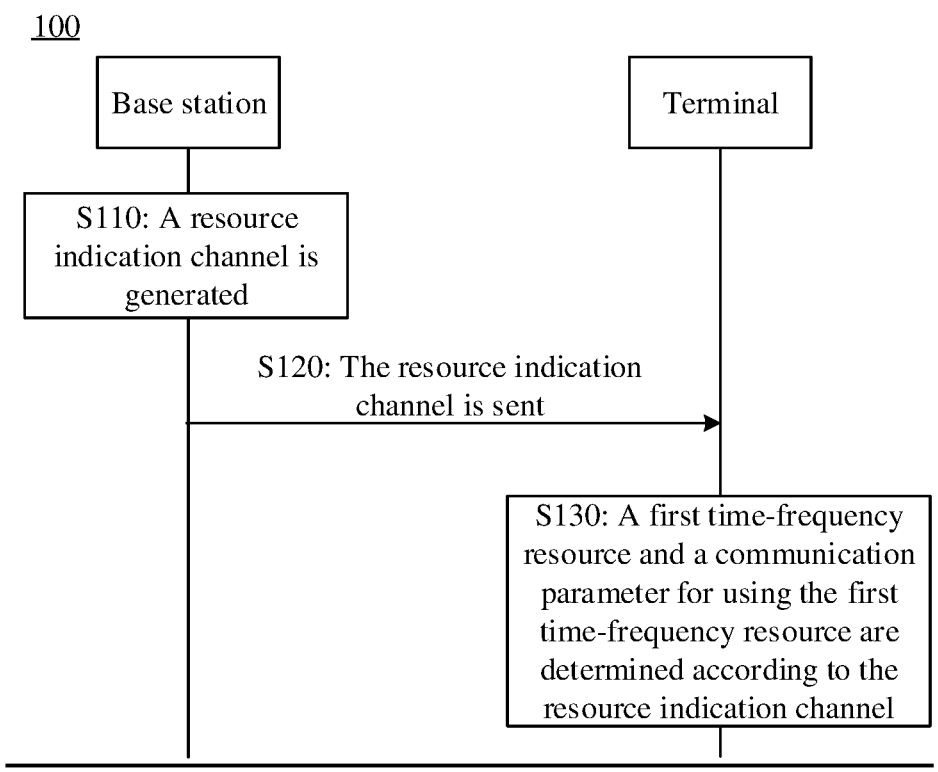
FIG. 1 is a schematic flowchart of a resource indication method according to an embodiment of the disclosure.

The technical solutions in the embodiments of the disclosure will be clearly and completely described below in combination with the drawings in the embodiments of the disclosure. Obviously, the described embodiments are not all embodiments but part of embodiments of the disclosure. On the basis of the embodiments in the disclosure, all other embodiments obtained by those skilled in the art without creative work fall within the scope of protection of the disclosure.

Terms "part", "module", "system" and the like used in the specification are adopted to represent an entity, hardware, firmware, combination of hardware and software, software or software in execution related to a computer. For example, a part may be, but not limited to, a process running on a processor, the processor, an object, an executable file, an execution thread, a program and/or a computer. It is illustrated that all applications running on computing equipment and the computing equipment may be parts. One or more parts may reside in a process and/or an execution thread, and the parts may be located on a computer and/or distributed between two or more computers. In addition, these parts may be executed from various computer-readable media on which various data structures are stored. The parts may communicate through local and/or remote processes according to, for example, signals with one or more data groups (for example, data from two parts interacting with each other in a local system, a distributed system and/or a network, for example, the Internet interacting with another system through a signal).

It should be understood that the technical solutions of the embodiments of the disclosure may be applied to various communication systems, for example: a GSM, a CDMA system, a WCDMA General Packet Radio Service (GPRS) system, an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system and a future 5G communication system.

Each embodiment in the disclosure is described in combination with a terminal. The terminal may communicate with one or more core networks through a Radio Access Network (RAN), and the terminal may refer to User Equipment (UE), an access terminal, a user unit, a subscriber station, a mobile radio station, a mobile station, a remote station, a remote terminal, mobile equipment, a user terminal, wireless communication equipment, a user agent or a user device. The access terminal may be a cellular telephone, a cordless telephone, a Session Initiation Protocol (SIP) telephone, a Wireless Local Loop (WLL) station, a Personal Digital Assistant (PDA), handheld equipment with a wireless communication function, computing equipment, or other processing equipment connected to a wireless modem, vehicle-mounted equipment, wearable equipment, terminal equipment in a future 5G network and the like.

Each embodiment in the disclosure is described in combination with a base station. The base station may be equipment configured to communicate with the terminal equipment, and for example, may be a Base Transceiver Station (BTS) in a GSM or CDMA, may also be a NodeB (NB) in a WCDMA system, and may further be an Evolutional Node B (eNB or eNodeB) in an LTE system. Or, the base station may be a relay station, an access point, vehicle-mounted equipment, wearable equipment, network-side equipment in the future 5G network and the like.

FIG. 1 is a schematic flowchart of a resource indication method 100 according to an embodiment of the disclosure.

As illustrated in FIG. 1, the method 100 involves a base station and a terminal, and includes, but not limited to, the following operations.

Figure 2A:
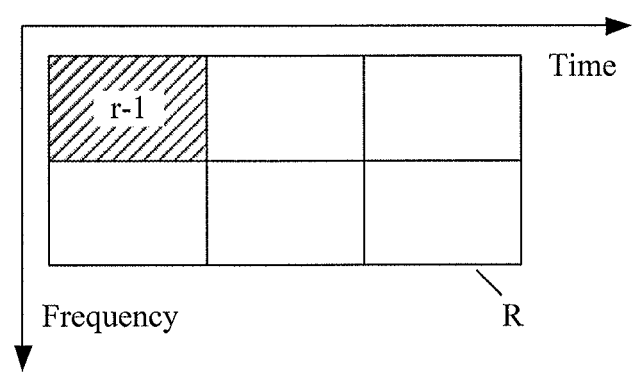
FIG. 2A to FIG. 2I are schematic diagrams of a resource indication channel and a first time-frequency resource according to embodiments of the disclosure.

In S110, the base station generates a resource indication channel according to a setting of a system and a current resource allocation condition. The resource indication channel is configured to indicate a first time-frequency resource and communication parameters for using the first time-frequency resource, and the resource indication channel occupies a second time-frequency resource. As schematically illustrated in FIG. 2A, the first time-frequency resource R includes the second time-frequency resource r (illustrated by a shadow part), that is, a time-frequency range occupied by the second time-frequency resource is within a time-frequency resource occupied by the first time-frequency resource.

It should be understood that the second time-frequency resource r of the embodiment of the disclosure may include at least one time-frequency unit. When the second time-frequency resource r includes only one time-frequency unit (for example, a first time-frequency unit r-1 illustrated in FIG. 2A), a time range corresponding to the first time-frequency unit r-1 is a time point set by the system, and a frequency range corresponding to the first time-frequency unit r-1 is a frequency raster (which may usually be recorded as $f_R$, for example, $f_R$=K×100 KHz, K being a factor related to a band) set by the system.

Figure 2B:
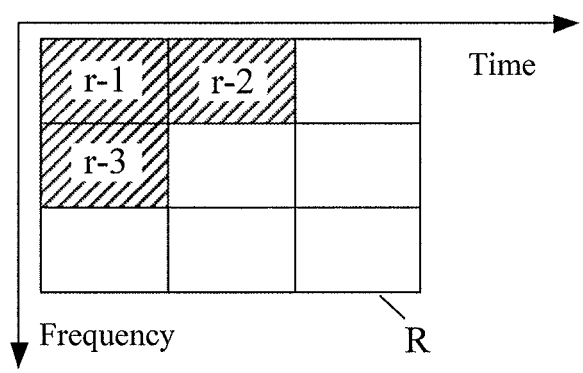

When the second time-frequency resource r includes multiple time-frequency units, the first time-frequency unit r-1 may include information indicating that the resource indication channel is extended from the first time-frequency unit r-1 to occupy multiple time-frequency units of the second time-frequency resource (for example, the first time-frequency unit r-1, the second time-frequency unit r-2 and the third time-frequency unit r-3 illustrated in FIG. 2B), i.e., extended to occupy information of the second time-frequency resource r. Here, the first time-frequency unit r-1 may be extended towards the time range, and may also be extended towards the frequency range, which will not be limited in the embodiment of the disclosure. The time range corresponding to the first time-frequency unit r-1 is still the time point set by the system, and the frequency range corresponding to the first time-frequency nit r-1 is still the frequency raster set by the system.

In addition, the resource indication channel is distributed on some resources with relatively fixed time ranges and frequency ranges, and the resource indication channel occupies relatively fewer time-frequency resources for indicating allocation of wider time-frequency resources in the vicinity and communication parameters. On the basis of the characteristics of the resource indication channel, the resource indication channel may be vividly called as an "anchor channel". Besides the examples, illustrated in FIG. 2A to FIG. 2I and FIG. 3, that the second time-frequency resource is in the first time-frequency resource, the time-frequency range of the second time-frequency resource occupied by the resource indication channel may also not be in the time-frequency range occupied by the first time-frequency resource, which will not be limited in the embodiment of the disclosure.

It should be understood that the first time-frequency resource indicated by the resource indication channel of the embodiment of the disclosure may also be considered to be a time range and a frequency range administered by the resource indication channel. A frequency range administered by a resource indication channel is N (N is more than or equal to 1) times of a frequency raster, and a time range administered by the resource indication channel is one or more fixed time units or configurable time lengths (which may be indicated in the resource indication channel). The system may predetermine that, if N is larger than 1, the terminal is not required to search for another resource indication channel from other N−1 frequency rasters in the time range administered by the resource indication channel, so that efficiency of exchanging the resource allocation condition between the base station and the terminal may be improved.

Figure 2C:
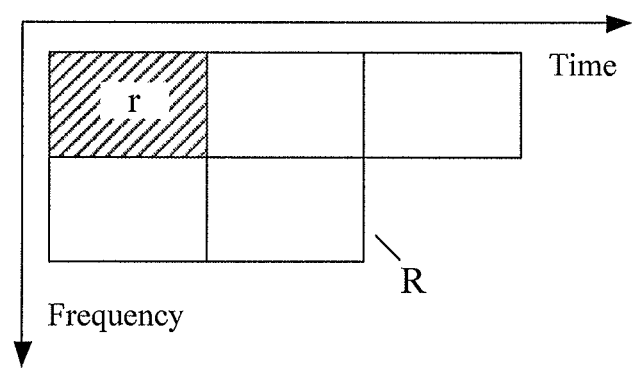
Figure 2D:
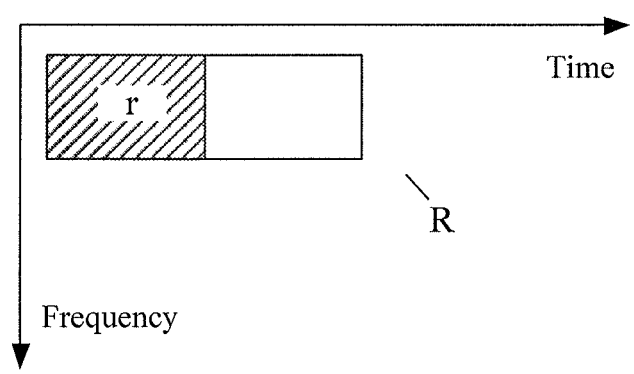
Figure 2E:
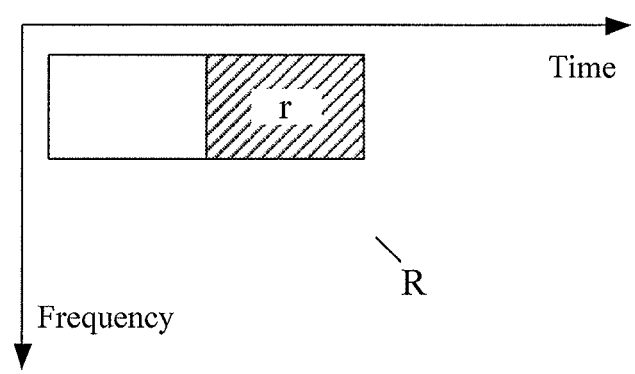
Figure 2F:
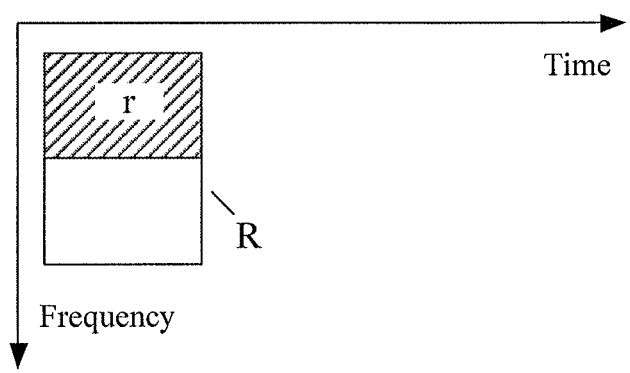
Figure 2G:
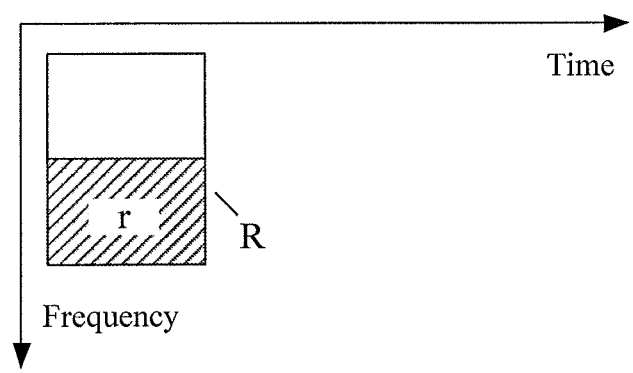
Figure 2H:
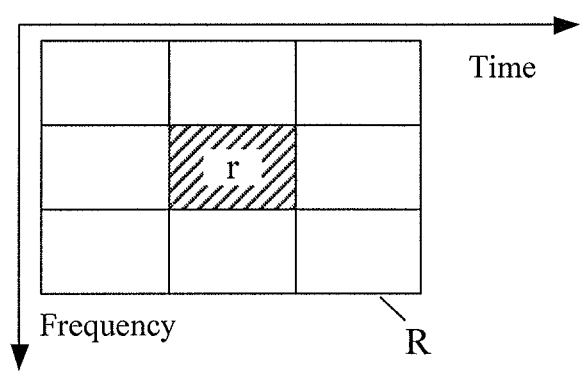

It is important to note that the first time-frequency resource R indicated by the resource indication channel in the embodiment of the disclosure may preferably include all resource units in a certain time range and a certain frequency range, i.e. a regularly shaped region illustrated in FIG. 2A and FIG. 2B; and the first time-frequency resource R may also be obtained by reducing some resource units in all the resource units in the certain time range and the certain frequency range, i.e. an irregularly shaped region illustrated in FIG. 2C. In addition, the second time-frequency resource r may be at an edge location of the first time-frequency resource R (as illustrated in FIG. 2A to FIG. 2G), and may also be at a non-edge location of the first time-frequency resource R (as illustrated in FIG. 2H).

Figure 2I:
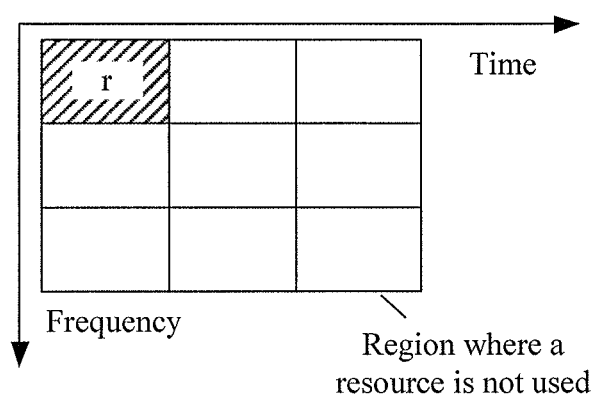

The resource indication channel may be configured to indicate that the first time-frequency resource is not used, that is, the resource indication channel may further be configured to indicate a region where the resource is not used, as illustrated in FIG. 2I. For example, it may be applied to a scenario of interference coordination between cells and the like. Using or not using the resource may be distinguished by setting values of indicating bits in the resource indication channel.

Figure 3:
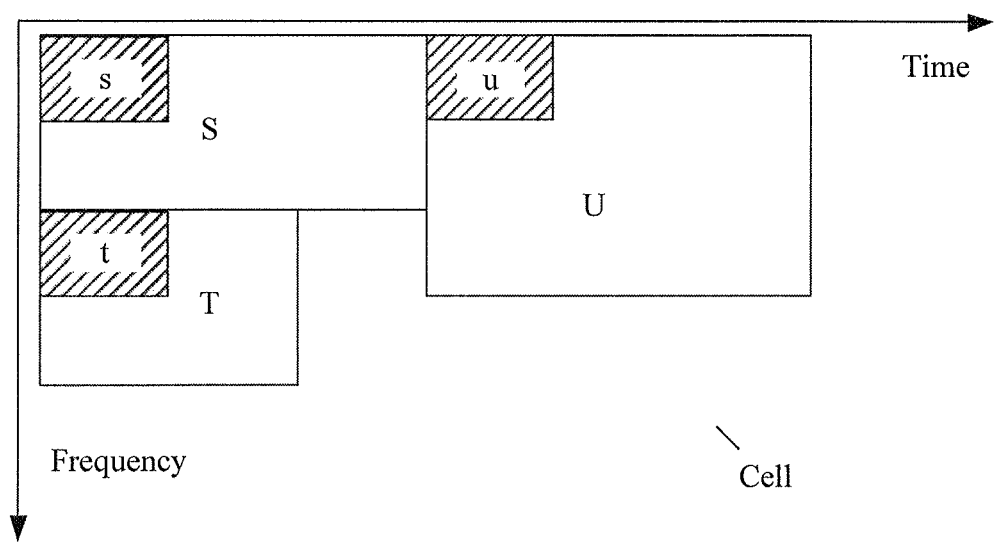
FIG. 3 is a schematic diagram of a cell according to an embodiment of the disclosure.

In the embodiment of the disclosure, at least one first time-frequency resource corresponding to at least one resource indication channel may form a cell. When the cell includes multiple first time-frequency resources corresponding to multiple resource indication channels, the multiple first time-frequency resources are not completely the same in terms of at least one of time ranges and frequency ranges. For example, as illustrated in FIG. 3, the cell includes three first time-frequency resources corresponding to three resource indication channels, including a first time-frequency resource S (corresponding to a resource indication channel s), a first time-frequency resource T (corresponding to a resource indication channel t) and a first time-frequency resource U (corresponding to a resource indication channel u) respectively. Time ranges of the first time-frequency resource S and the first time-frequency resource T are different, and frequency ranges corresponding to the first time-frequency resource S and the first time-frequency resource U are different. Therefore, the solution of the embodiment of the disclosure may break limits of occupation of fixed continuous bandwidths by cells and/or carriers in the related art, and may further allocate time-frequency resources more flexibly, improve performance and applicability of the wireless communication system and implement optimal utilization of the resources.

In the embodiment of the disclosure, the communication parameters may include a cell ID to identify the cell to which the first time-frequency resource corresponding to the resource indication channel belongs. The cell ID may be a 32-bit string. In the embodiment of the disclosure, the resource indication channel may include the complete cell ID, and may also include part of the cell ID (for example, including 16 bits), and the other part of the cell ID is transmitted in another resource indication channel, or sent through additional dedicated signaling or message. Of course, in the embodiment of the disclosure, the cell ID may also completely not be transmitted through the resource indication channel, but is notified to the terminal in another manner, which will not be limited in the embodiment of the disclosure.

In the embodiment of the disclosure, the communication parameters may include at least one of a multiple access technology used for the first time-frequency resource, a duplex manner used for the first time-frequency resource, a communication mode used for the first time-frequency resource and basic physical parameters corresponding to the multiple access technology used for the first time-frequency resource.

Wherein, the multiple access technology used for the first time-frequency resource may include at least one of: for example, an Orthogonal Frequency Division Multiplexing (OFDM) technology, a Single-Carrier Frequency-Division Multiple Access (SC-FDMA) technology, a simple Frequency Division Multiple Access (FDMA) technology, a CDMA technology and the like. A time-frequency resource allocation and indication solution of the embodiment of the disclosure may allow various multiple access technologies in the system to flexibly coexist.

When including the multiple access technology used for the first time-frequency resource, the communication parameters may further include the basic physical parameters corresponding to the multiple access technology. In a specific example, the first time-frequency resource uses the OFDM technology, its basic physical parameters may include a subcarrier spacing on a frequency domain, a Cyclic Prefix (CP) length, a Transmission Time Interval (TTI) length on a time domain and the like.

The duplex manner used for the first time-frequency resource may include FDD, half FDD, TDD, full duplex and the like.

The communication mode used for the first time-frequency resource may include a communication from the base station to the terminal, a Device-to-Device (D2D) communication and the like.

In the embodiment of the disclosure, the communication parameters of the resource indication channel may further include control channel information carried in the first time-frequency resource. For example, the control channel information may include at least one of BCH information, MIB information, a PCH, downlink common control channel information, downlink dedicated control channel information, self-contained mode information, uplink random access channel information and uplink control channel information.

The communication parameters may include information about whether there is a BCH or MIB in the first time-frequency resource or not. Generally speaking, there is at least one BCH or MIB in a cell, and in each first time-frequency resource of the cell, there may be a BCH or an MIB, and there may also be no BCH or MIB.

The communication parameters may include information about whether there is a PCH in the first time-frequency resource or not.

The communication parameters may include information about whether there is a downlink common control channel in the first time-frequency resource or not, and if there are downlink common control channels, the communication parameters may further include a time-frequency location of a first downlink common control channel, and the time-frequency location may be indicated by an offset relative to the resource indication channel.

The communication parameters may include information about whether there is a downlink dedicated control channel in the first time-frequency resource or not, and if there are downlink dedicated control channels, the communication parameters may further include a time-frequency location of a first downlink dedicated control channel, and the time-frequency location may be indicated by an offset relative to the resource indication channel.

For a TDD system, the communication parameters may further include information about whether the first time-frequency resource adopts a self-contained mode or not. The self-contained mode refers to simultaneous inclusion of a downlink and an uplink, and downlink transmission within the same time range is fed back in an uplink.

The communication parameters may include information about whether there is an uplink random access channel in the first time-frequency resource or not, and if there are uplink random access channels, the communication parameters may further include time-frequency locations and number of the random access channels, and the time-frequency location may be indicated by an offset relative to the resource indication channel.

The communication parameters may include information about whether is an uplink control channel in the first time-frequency resource or not, and if there are uplink control channels, the communication parameters may further include time-frequency locations and number of the uplink control channels, and the time-frequency location may be indicated by an offset relative to the resource indication channel.

It should be understood that contents of the resource indication channel of the embodiment of the disclosure are not limited to the contents listed above, and according to a system requirement, the resource indication channel may further include another related communication parameters, which will not be limited in the embodiment of the disclosure.

When the cell where the first time-frequency resource is located includes multiple resource indication channels, a last resource indication channel of the cell may include information indicating that the resource indication channel is the last resource indication channel of the cell to enable the terminal to stop searching for resource indication channels, so that performance and efficiency of the system may be improved. The resource indication channel may be indicated to be the last resource indication channel of the cell in an explicit manner. For example, an identification bit is set, and whether it is the last resource indication channel or not is distinguished according to a value of the identification bit. The resource indication channel may be indicated to be the last resource indication channel of the cell in an implicit manner. For example, a specific characteristic sequence (for example, a sequence with a specific difference of cyclic shift spacings from a root sequence) is used in the resource indication channel to implicitly indicate that it is the last resource indication channel. There are no limits made to a specific implementation mode in the embodiment of the disclosure.

When the cell where the first time-frequency resource is located includes multiple resource indication channels, a non-last resource indication channel of the cell may include a time range and a frequency range configured to indicate a next resource indication channel in the cell to enable the terminal to quickly find the next resource indication channel, so that the performance and efficiency of the system may be improved.

It should be understood that the time range and frequency range indicating the next resource indication channel may implicitly indicate. For example, a default form may be adopted, and the next resource indication channel is determined to be on a next time unit of the same frequency raster after the first time-frequency resource as a default. But the embodiment of the disclosure is not limited so. The time range and frequency range indicating the next resource indication channel may also explicitly indicate. Particularly when the first time-frequency resource administered by the resource indication channel is irregular, a location of the next resource indication channel may be directly notified to the terminal in an explicit indication manner.

After the base station generates the resource indication channel in S110, in S120, the base station sends the resource indication channel to the terminal. Correspondingly, the terminal receives the resource indication channel sent by the base station.

In the embodiment of the disclosure, preferably, the resource indication channel is sent in a simple single-carrier manner, i.e. a non-multi-carrier manner such as a non-OFDM manner. In addition, preferably, Multiple-Input Multiple-Output (MIMO) technology may not be used, but using a multi-antenna transmit diversity technology transparent to the terminal or enabling the terminal to perform blind detection. There are no limits regarding whether to send the resource indication channel by virtue of the abovementioned manner or not in the embodiment of the disclosure. Moreover, preferably, the base station may modulate the resource indication channel in a modulation manner preset by the system. The terminal quickly demodulates according to the preset manner. The base station may further set a characteristic sequence in the resource indication channel, and the characteristic sequence is configured to indicate that the current channel is a resource indication channel to enable the terminal to quickly and accurately find the resource indication channel.

Relatively basic parameters are used for sending when the resource indication channel is sent by the abovementioned measures, so that detection complexity of the terminal may be reduced, the terminal may quickly and accurately find and demodulate the resource indication channel, and system efficiency may be improved.

The characteristic sequence included in the resource indication channel may also be configured for time and frequency synchronization, or may represent (all or part of) the cell ID. An M sequence or another sequence with high orthogonality (autocorrelation and cross correlation) may usually be used. The same root sequence and/or homologous sequences acquired in a manner of cyclically shifting the root sequence and the like may be used for different resource indication channels in the same cell.

In the embodiment of the disclosure, before the base station sends the resource indication channel to the terminal, the base station may further set a guard band for the resource indication channel. For the condition that the resource indication channel is located on an edge of a total available band, an out-of-band radiation index should be consistent with a local supervision requirement. For the condition that the resource indication channel is located in a system band, the out-of-band radiation index should be consistent with an in-band mutual interference requirement.

It should be understood that, in the embodiment of the disclosure, different cells may stagger sending patterns of resource indication channels in terms of time or frequency to avoid mutual interference. Under such a condition, a certain time coordination relationship is required to exist between the cells.

In S130, the terminal determines the first time-frequency resource and the communication parameters for using the first time-frequency resource according to the resource indication channel.

A resource indication method 200 of the embodiment of the disclosure will be described below from the angle of a base station. Correspondingly to the method 100, as illustrated in FIG. 4, the method 200 may include the following operations.

In S210, the base station generates a resource indication channel, the resource indication channel indicating a first time-frequency resource and communication parameters for using the first time-frequency resource, the resource indication channel occupying a second time-frequency resource and at least one first time-frequency resource corresponding to at least one resource indication channel forming a cell.

In S220, the base station sends the resource indication channel to a terminal.

According to the resource indication method of the embodiment of the disclosure, the base station generates and sends the resource indication channel, wherein the resource indication channel is configured to indicate the time-frequency resource and the communication parameters for using the time-frequency resource, and the at least one time-frequency resource corresponding to the at least one resource indication channel forms the cell, so that resource allocation and indication flexibility is improved, and performance and applicability of a wireless communication system may be improved.

In the embodiment of the disclosure, before the operation that the base station sends the resource indication channel to the terminal in S220, the method 200 may further include that:

the base station sets a guard band for the resource indication channel.

In the embodiment of the disclosure, the operation that the base station sends the resource indication channel to the terminal in S220 may include that:

the base station sends the resource indication channel to the terminal after performing multi-antenna transmit diversity on the resource indication channel.

In the embodiment of the disclosure, the operation that the base station sends the resource indication channel to the terminal in S220 may include that:

the base station sends the resource indication channel to the terminal in a single-carrier manner.

In the embodiment of the disclosure, the second time-frequency resource may include at least one time-frequency unit, a time range corresponding to a first time-frequency unit in the at least one time-frequency unit is a time point set by a system, a frequency range corresponding to the first time-frequency unit is a frequency raster set by the system, and when the second time-frequency resource includes multiple time-frequency units, the first time-frequency unit includes information indicating that the resource indication channel is extended to occupy information of the second time-frequency resource.

In the embodiment of the disclosure, the resource indication channel may include a characteristic sequence, and the characteristic sequence is configured to indicate that the current channel is a resource indication channel.

In the embodiment of the disclosure, the characteristic sequence may further be configured for synchronization of the base station and the terminal.

In the embodiment of the disclosure, the operation that the base station sends the resource indication channel to the terminal in S220 may include that:

the base station sends the resource indication channel to the terminal after modulating the resource indication channel in a modulation manner preset by the system.

In the embodiment of the disclosure, the resource indication channel may include information indicating that the resource indication channel is a last resource indication channel of the cell.

In the embodiment of the disclosure, the resource indication channel may include a time range and a frequency range indicating a next resource indication channel in the cell.

In the embodiment of the disclosure, the cell may include multiple first time-frequency resources corresponding to multiple resource indication channels, and the multiple first time-frequency resources are not completely the same in terms of at least one of time ranges and frequency ranges.

In the embodiment of the disclosure, the communication parameters may include at least one of a multiple access technology used for the first time-frequency resource, a duplex manner used for the first time-frequency resource, a communication mode used for the first time-frequency resource and basic physical parameters corresponding to the multiple access technology used for the first time-frequency resource.

In the embodiment of the disclosure, the communication parameters may include a cell ID.

In the embodiment of the disclosure, the communication parameters may include control channel information carried in the first time-frequency resource.

In the embodiment of the disclosure, the control channel information may include at least one of BCH information, MIB information, a PCH, downlink common control channel information, downlink dedicated control channel information, self-contained mode information, uplink random access channel information and uplink control channel information.

In the embodiment of the disclosure, the resource indication channel may be configured to indicate that the first time-frequency resource is not used.

It can be understood that a flow of the method 200 is the same as a corresponding flow of the method 100, and will not be elaborated herein.

A resource indication method 300 of the embodiments of the disclosure will be described below from the angle of a terminal. Correspondingly to the method 100, as illustrated in FIG. 5, the method 300 may include the following operations.

In S310, the terminal receives a resource indication channel sent by a base station, the resource indication channel indicating a first time-frequency resource and a communication parameters for using the first time-frequency resource, the resource indication channel occupying a second time-frequency resource and at least one first time-frequency resource corresponding to at least one resource indication channel forming a cell.

In S320, the terminal determines the first time-frequency resource and the communication parameters for using the first time-frequency resource according to the resource indication channel.

According to the resource indication method of the embodiment of the disclosure, the terminal receives the resource indication channel sent by the base station, and determines the time-frequency resource and the communication parameters for using the time-frequency resource according to the resource indication channel, and the at least one time-frequency resource corresponding to the at least one resource indication channel forms the cell, so that resource allocation and indication flexibility is improved, and performance and applicability of a wireless communication system may be improved.

In the embodiment of the disclosure, a guard band may be set for the resource indication channel.

In the embodiment of the disclosure, the operation that the terminal receives the resource indication channel sent by the base station in S310 may include that:

the terminal receives the resource indication channel sent by the base station in a single-carrier manner.

In the embodiment of the disclosure, the operation that the terminal receives the resource indication channel sent by the base station in S310 may include that:

the terminal receives the resource indication channel sent by the base station through multi-antenna transmit diversity.

In the embodiment of the disclosure, the second time-frequency resource may include at least one time-frequency unit, a time range corresponding to a first time-frequency unit in the at least one time-frequency unit is a time point set by a system, a frequency range corresponding to the first time-frequency unit is a frequency raster set by the system, and the first time-frequency unit includes information indicating the resource indication channel is extended to occupy information of the second time-frequency resource.

In the embodiment of the disclosure, the resource indication channel may include a characteristic sequence, and the characteristic sequence is configured to indicate that the current channel is a resource indication channel.

In the embodiment of the disclosure, the method 300 may further include that:

the terminal performs synchronization with the base station according to the characteristic sequence.

In the embodiment of the disclosure, the operation that the terminal determines the first time-frequency resource and the communication parameters for usingthe first time-frequency resource according to the resource indication channel in S320, the method 300 may further include that:

the terminal demodulates the resource indication channel in a modulation manner preset by a system.

In the embodiment of the disclosure, the resource indication channel may include information indicating that the resource indication channel is a last resource indication channel of the cell.

In the embodiment of the disclosure, the resource indication channel may include a time range and a frequency range indicating a next resource indication channel in the cell.

In the embodiment of the disclosure, the cell may include multiple first time-frequency resources corresponding to multiple resource indication channels, and the multiple first time-frequency resources are not completely the same in terms of at least one of time ranges and frequency ranges.

In the embodiment of the disclosure, the communication parameters may include at least one of a multiple access technology used for the first time-frequency resource, a duplex manner used for the first time-frequency resource, a communication mode used for the first time-frequency resource and basic physical parameters corresponding to the multiple access technology used for the first time-frequency resource.

In the embodiment of the disclosure, the communication parameters may include a cell ID.

In the embodiment of the disclosure, the communication parameters may include control channel information carried in the first time-frequency resource.

In the embodiment of the disclosure, the control channel information may include at least one of BCH information, MIB information, a PCH, downlink common control channel information, downlink dedicated control channel information, self-contained mode information, uplink random access channel information and uplink control channel information.

In the embodiment of the disclosure, the resource indication channel may be configured to indicate that the first time-frequency resource is not used.

It can be understood that a flow of the method 300 is the same as a corresponding flow of the method 100, and will not be elaborated herein.

It should be understood that, in each embodiment of the disclosure, a sequence number of each process does not mean an execution sequence, the execution sequence of each process should be determined according to its function and an internal logic, and an implementation process of the embodiment of the disclosure should not be limited.

The resource indication method of the embodiments of the disclosure is described above in detail, and the base station and the terminal of the embodiments of the disclosure will be described below.

Figure 6:
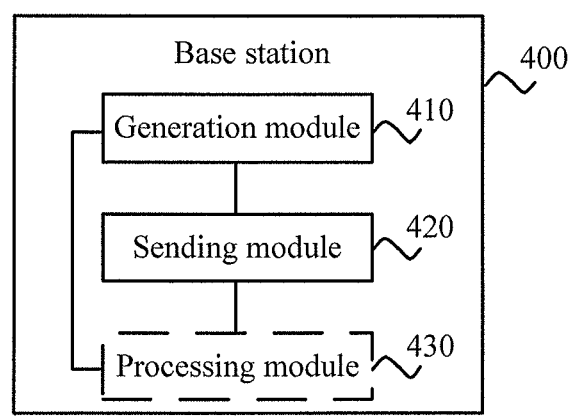
FIG. 6 is a schematic block diagram of a base station according to an embodiment of the disclosure.

FIG. 6 is a schematic block diagram of a base station 400 according to an embodiment of the disclosure. The base station 400 includes:

a generation module 410, configured to generate a resource indication channel, the resource indication channel indicating a first time-frequency resource and communication parameters for using the first time-frequency resource, the resource indication channel occupying a second time-frequency resource and at least one first time-frequency resource corresponding to at least one resource indication channel forming a cell; and a sending module 420, configured to send the resource indication channel generated by the generation module 410 to a terminal.

The base station of the embodiment of the disclosure generates and sends the resource indication channel, wherein the resource indication channel is configured to indicate the time-frequency resource and the communication parameters for using the time-frequency resource, and the at least one time-frequency resource corresponding to the at least one resource indication channel forms the cell, so that resource allocation and indication flexibility is improved, and performance and applicability of a wireless communication system may be improved.

Alternatively, in the embodiment of the disclosure, a time-frequency range occupied by the second time-frequency resource may be within a time-frequency range occupied by the first time-frequency resource.

Alternatively, in the embodiment of the disclosure, the second time-frequency resource may include at least one time-frequency unit, a time range corresponding to a first time-frequency unit in the at least one time-frequency unit is a time point set by a system, a frequency range corresponding to the first time-frequency unit is a frequency raster set by the system, and when the second time-frequency resource includes multiple time-frequency units, the first time-frequency unit includes information indicating that the resource indication channel is extended to occupy the time-frequency units of the second time-frequency resource.

Alternatively, in the embodiment of the disclosure, the communication parameters may include at least one of a multiple access technology used for the first time-frequency resource, a duplex manner used for the first time-frequency resource, a communication mode used for the first time-frequency resource and basic physical parameters corresponding to the multiple access technology used for the first time-frequency resource.

Alternatively, in the embodiment of the disclosure, the communication parameters may include a cell ID.

Alternatively, in the embodiment of the disclosure, the communication parameters may include control channel information carried in the first time-frequency resource.

Alternatively, in the embodiment of the disclosure, the control channel information may include at least one of BCH information, MIB information, a PCH, downlink common control channel information, downlink dedicated control channel information, self-contained mode information, uplink random access channel information and uplink control channel information.

Alternatively, in the embodiment of the disclosure, the resource indication channel may include a characteristic sequence, and the characteristic sequence is configured to indicate that the current channel is a resource indication channel.

Alternatively, in the embodiment of the disclosure, the characteristic sequence may further be configured for synchronization of the base station and the terminal.

Alternatively, in the embodiment of the disclosure, the sending module 420 may specifically be configured to:

send the resource indication channel to the terminal after the resource indication channel is modulated in a modulation manner preset by the system.

Alternatively, in the embodiment of the disclosure, the sending module 420 may specifically be configured to:

send the resource indication channel to the terminal after multi-antenna transmit diversity is performed on the resource indication channel.

Alternatively, in the embodiment of the disclosure, the sending module 420 may specifically be configured to:

send the resource indication channel to the terminal in a single-carrier manner.

Alternatively, in the embodiment of the disclosure, the resource indication channel may include information indicating that the resource indication channel is a last resource indication channel of the cell.

Alternatively, in the embodiment of the disclosure, the resource indication channel may include a time range and a frequency range indicating a next resource indication channel in the cell.

Alternatively, in the embodiment of the disclosure, the cell may include multiple first time-frequency resources corresponding to multiple resource indication channels, and the multiple first time-frequency resources are not completely the same in terms of at least one of time ranges and frequency ranges.

Alternatively, in the embodiment of the disclosure, the resource indication channel may be configured to indicate that the first time-frequency resource is not used.

Alternatively, in the embodiment of the disclosure, the base station 400 may further include:

a processing module 430, configured to, before the sending module sends the resource indication channel to the terminal, set a guard band for the resource indication channel.

The base station of the embodiment of the disclosure generates and sends the resource indication channel, wherein the resource indication channel is configured to indicate the time-frequency resource and the communication parameters for using the time-frequency resource, and the at least one time-frequency resource corresponding to the at least one resource indication channel forms the cell, so that the resource allocation and indication flexibility is improved, and the performance and applicability of the wireless communication system may be improved.

Figure 7:
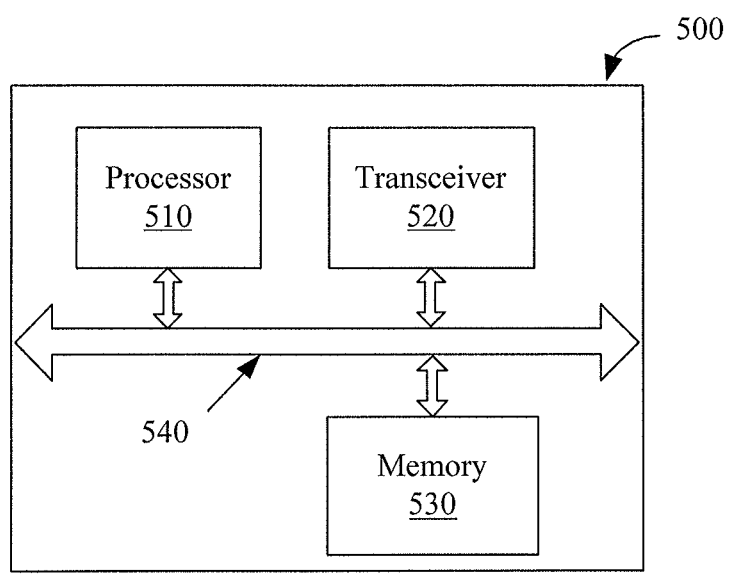
FIG. 7 is a schematic block diagram of a base station according to another embodiment of the disclosure.

It is important to note that, in the embodiment of the disclosure, the generation module 410 and the processing module 430 may be implemented by a processor, and the sending module 420 may be implemented by a transceiver. As illustrated in FIG. 7, a base station 500 may include a processor 510, a transceiver 520 and a memory 530, wherein the memory 530 may be configured to store codes and the like executed by the processor 510.

Components in the base station 500 are coupled together through a bus system 540, wherein the bus system 540 includes a data bus, and further includes a power bus, a control bus and a state signal bus.

The base station 400 illustrated in FIG. 6 or the base station 500 illustrated in FIG. 6 may implement each process implemented in the embodiments illustrated in FIG. 1 to FIG. 6, which will not be elaborated herein to avoid repetition.

It is important to note that the method embodiments of the disclosure may be applied to a processor or implemented by the processor. The processor may be an integrated circuit chip with a signal processing capability. In an implementation process, each operation of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information in the memory, and completes the operations of the methods in combination with hardware.

It can be understood that the memory in the embodiment of the disclosure may be a volatile memory or a nonvolatile memory, or may include both the volatile and nonvolatile memories, wherein the nonvolatile memory may be a ROM, a PROM, an Erasable PROM (EPROM), an EEPROM or a flash memory. The volatile memory may be a RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DR RAM). It is important to note that the memory of a system and method described in the disclosure is intended to include, but not limited to, memories of these and any other proper types.

Figure 8:
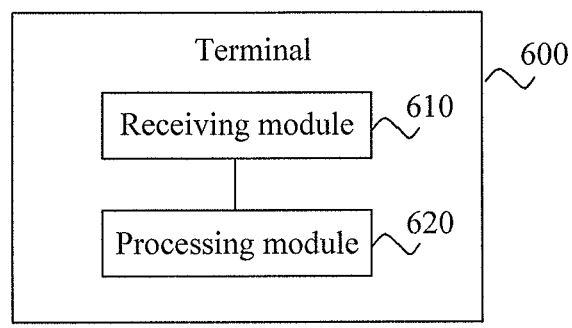
FIG. 8 is a schematic block diagram of a terminal according to an embodiment of the disclosure.

FIG. 8 is a schematic block diagram of a terminal 600 according to an embodiment of the disclosure. The terminal 600 includes:

a receiving module 610, configured to receive a resource indication channel sent by a base station, the resource indication channel indicating a first time-frequency resource and communication parameters for using the first time-frequency resource, the resource indication channel occupying a second time-frequency resource and at least one first time-frequency resource corresponding to at least one resource indication channel forming a cell; and a processing module 620, configured to determine the first time-frequency resource and the communication parameters for using the first time-frequency resource according to the resource indication channel received by the receiving module 610.

The terminal of the embodiment of the disclosure receives the resource indication channel sent by the base station, and determines the time-frequency resource and the communication parameters for using the time-frequency resource according to the resource indication channel, and the at least one time-frequency resource corresponding to the at least one resource indication channel forms the cell, so that resource allocation and indication flexibility is improved, and performance and applicability of a wireless communication system may be improved.

Alternatively, in the embodiment of the disclosure, a time-frequency range occupied by the second time-frequency resource may be within a time-frequency range occupied by the first time-frequency resource.

Alternatively, in the embodiment of the disclosure, the second time-frequency resource may include at least one time-frequency unit, a time range corresponding to a first time-frequency unit in the at least one time-frequency unit is a time point set by a system, a frequency range corresponding to the first time-frequency unit is a frequency raster set by the system, and the first time-frequency unit includes information indicating that the resource indication channel is extended to occupy information of the second time-frequency resource.

Alternatively, in the embodiment of the disclosure, the communication parameters may include at least one of a multiple access technology used for the first time-frequency resource, a duplex manner used for the first time-frequency resource, a communication mode used for the first time-frequency resource and basic physical parameters corresponding to the multiple access technology used for the first time-frequency resource.

Alternatively, in the embodiment of the disclosure, the communication parameters may include a cell ID.

Alternatively, in the embodiment of the disclosure, the communication parameters may include control channel information carried in the first time-frequency resource.

Alternatively, in the embodiment of the disclosure, the control channel information may include at least one of BCH information, MIB information, a PCH, downlink common control channel information, downlink dedicated control channel information, self-contained mode information, uplink random access channel information and uplink control channel information.

Alternatively, in the embodiment of the disclosure, the resource indication channel may include a characteristic sequence, and the characteristic sequence is configured to indicate that a current channel is a resource indication channel.

Alternatively, in the embodiment of the disclosure, the processing module 620 may further be configured to:

perform synchronization with the base station according to the characteristic sequence.

Alternatively, in the embodiment of the disclosure, the processing module 620 may further be configured to:

before determining the first time-frequency resource and the communication parameters for using the first time-frequency resource according to the resource indication channel, demodulate the resource indication channel in a modulation manner preset by a system.

Alternatively, in the embodiment of the disclosure, the receiving module 610 may specifically be configured to:

receive the resource indication channel sent by the base station in a single-carrier manner.

Alternatively, in the embodiment of the disclosure, the receiving module 610 may specifically be configured to:

receive the resource indication channel sent by the base station through multi-antenna transmit diversity.

Alternatively, in the embodiment of the disclosure, the resource indication channel may include information indicating that the resource indication channel is a last resource indication channel of the cell.

Alternatively, in the embodiment of the disclosure, the resource indication channel may include a time range and frequency range indicating a next resource indication channel in the cell.

Alternatively, in the embodiment of the disclosure, the cell may include multiple first time-frequency resources corresponding to multiple resource indication channels, and the multiple first time-frequency resources are not completely the same in terms of at least one of time ranges and frequency ranges.

Alternatively, in the embodiment of the disclosure, the resource indication channel may be configured to indicate that the first time-frequency resource is not used.

Alternatively, in the embodiment of the disclosure, a guard band may be set for the resource indication channel.

The terminal of the embodiment of the disclosure receives the resource indication channel sent by the base station, and determines the time-frequency resource and the communication parameters for using the time-frequency resource according to the resource indication channel, and the at least one time-frequency resource corresponding to the at least one resource indication channel forms the cell, so that the resource allocation and indication flexibility is improved, and the performance and applicability of the wireless communication system may be improved.

Figure 9:
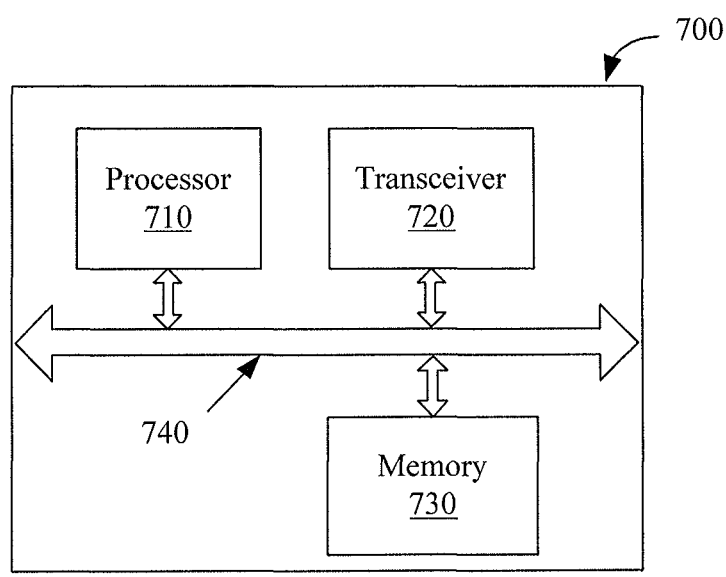
FIG. 9 is a schematic block diagram of a terminal according to another embodiment of the disclosure.

It is important to note that, in the embodiment of the disclosure, the processing module 620 may be implemented by a processor, and the receiving module 610 may be implemented by a transceiver. As illustrated in FIG. 9, a terminal 700 may include a processor 710, a transceiver 720 and a memory 730, wherein the memory 730 may be configured to store codes and the like executed by the processor 710.

Components in the terminal 700 are coupled together through a bus system 740, wherein the bus system 740 includes a data bus, and further includes a power bus, a control bus and a state signal bus.

The terminal 600 illustrated in FIG. 8 or the terminal 700 illustrated in FIG. 9 may implement each process implemented in the embodiments illustrated in FIG. 1 to FIG. 6, which will not be elaborated herein to avoid repetition.

Those skilled in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solution. Those skilled in the art may realize the described functions for each specific application by virtue of different methods, but such realization shall fall within the scope of the disclosure.

Those skilled in the art may clearly learn about that specific processes of the system, device and unit described above may refer to the corresponding processes in the method embodiments for convenient and brief description, which will not be elaborated herein.

In some embodiments provided by the disclosure, it should be understood that the disclosed system, device and method may be implemented in another manner. The device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between displayed or discussed components may be indirect coupling or communication connection, implemented through some interfaces, indirect coupling or communication connection of the device or the units may be electrical and mechanical or adopt other forms.

The units described as separate parts may or may not be physically separated, and parts displayed as units may or may not be physical units, namely located in the same place or distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two unit may also be integrated into a unit.

When being implemented in form of software function unit and sold or used as an independent product, the function may also be stored in a computer-readable storage medium. Based on such an understanding, the technical solutions of the disclosure substantially or parts making contributions to a related art may be embodied in form of software product, and the computer software product is stored in a storage medium, including a plurality of instructions configured to enable a piece of computer equipment (which may be a personal computer, a server, network equipment or the like) to execute all or part of the steps of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A resource indication method, comprising:
sending, by a base station, a first time-frequency resource and communication parameters for using the first time-frequency resource to a terminal, the first time-frequency resource and the communication parameters being carried in a resource indication channel, wherein a second time-frequency resource for the resource indication channel comprises at least one time-frequency unit, a time range corresponding to a first time-frequency unit in the at least one time-frequency unit is determined according to a preset time point, a frequency range corresponding to the first time-frequency unit is determined according to a preset frequency raster.

2. The method according to claim 1, wherein the communication parameters comprise at least one of the following: a multiple access technology for the first time-frequency resource, a duplex manner for the first time-frequency resource, a communication mode for the first time-frequency resource, or basic physical parameters corresponding to the multiple access technology for the first time-frequency resource.

3. The method according to claim 2, wherein the basic physical parameters comprise a subcarrier spacing.

4. The method according to claim 1, wherein the communication parameters further comprise control channel information carried in the first time-frequency resource.

5. The method according to claim 4, wherein the control channel information comprises at least one of the following: Broadcast Channel (BCH) information, Master Information Block (MIB) information, a Paging Channel (PCH), downlink common control channel information, downlink dedicated control channel information, self-contained mode information, uplink random access channel information, or uplink control channel information.

6. The method according to claim 1, further comprising:
sending, by the base station, a characteristic sequence to the terminal, the characteristic sequence being configured to indicate that a channel indicated by the characteristic sequence is a resource indication channel.

7. A resource indication method, comprising:
receiving, by a terminal, a first time-frequency resource and communication parameters for using the first time-frequency resource sent by a base station, the first time-frequency resource and the communication parameters being carried in a resource indication channel, wherein a second time-frequency resource for the resource indication channel comprises at least one time-frequency unit, a time range corresponding to a first time-frequency unit in the at least one time-frequency unit is determined according to a preset time point, a frequency range corresponding to the first time-frequency unit is determined according to a preset frequency raster.

8. The method according to claim 7, wherein the communication parameters comprise at least one of the following: a multiple access technology for the first time-frequency resource, a duplex manner for the first time-frequency resource, a communication mode for the first time-frequency resource, or basic physical parameters corresponding to the multiple access technology for the first time-frequency resource.

9. The method according to claim 8, wherein the basic physical parameters comprise a subcarrier spacing.

10. The method according to claim 7, wherein the communication parameters further comprise control channel information carried in the first time-frequency resource.

11. The method according to claim 10, wherein the control channel information comprises at least one of the following: Broadcast Channel (BCH) information, Master Information Block (MIB) information, a Paging Channel (PCH), downlink common control channel information, downlink dedicated control channel information, self-contained mode information, uplink random access channel information, or uplink control channel information.

12. The method according to claim 7, further comprising:
receiving, by the terminal, a characteristic sequence from the base station, the characteristic sequence being configured to indicate that a channel indicated by the characteristic sequence is a resource indication channel.

13. The method according to claim 7, wherein the first time-frequency resource is a time-frequency resource of a cell.

14. A base station, comprising: a transceiver, configured to:
send a first time-frequency resource and communication parameters for using the first time-frequency resource to a terminal, the first time-frequency resource and the communication parameters being carried in a resource indication channel, wherein a second time-frequency resource for the resource indication channel comprises at least one time-frequency unit, a time range corresponding to a first time-frequency unit in the at least one time-frequency unit is determined according to a preset time point, a frequency range corresponding to the first time-frequency unit is determined according to a preset frequency raster.

15. The base station according to claim 14, wherein the communication parameters comprise at least one of the following: a multiple access technology for the first time-frequency resource, a duplex manner for the first time-frequency resource, a communication mode for the first time-frequency resource, or basic physical parameters corresponding to the multiple access technology for the first time-frequency resource.

16. The base station according to claim 15, wherein the basic physical parameters comprise a subcarrier spacing.

17. The base station according to claim 14, wherein the communication parameters further comprise control channel information carried in the first time-frequency resource.

18. The base station according to claim 17, wherein the control channel information comprises at least one of the following: Broadcast Channel (BCH) information, Master Information Block (MIB) information, a Paging Channel (PCH), downlink common control channel information, downlink dedicated control channel information, self-contained mode information, uplink random access channel information, or uplink control channel information.

19. The base station according to claim 14, wherein the transceiver is further configured to:
send a characteristic sequence to the terminal, the characteristic sequence being configured to indicate that a channel indicated by the characteristic sequence is a resource indication channel.

20. A terminal, comprising: a transceiver configured to:
receive a first time-frequency resource and communication parameters for using the first time-frequency resource sent by a base station, the first time-frequency resource and the communication parameters being carried in a resource indication channel, wherein a second time-frequency resource for the resource indication channel comprises at least one time-frequency unit, a time range corresponding to a first time-frequency unit in the at least one time-frequency unit is determined according to a preset time point, a frequency range corresponding to the first time-frequency unit is determined according to a preset frequency raster.

21. The terminal according to claim 20, wherein the communication parameters comprise at least one of the following: a multiple access technology for the first time-frequency resource, a duplex manner for the first time-frequency resource, a communication mode for the first time-frequency resource, or basic physical parameters corresponding to the multiple access technology for the first time-frequency resource.

22. The terminal according to claim 21, wherein the basic physical parameters comprise a subcarrier spacing.

23. The terminal according to claim 20, wherein the communication parameters further comprise control channel information carried in the first time-frequency resource.

24. The terminal according to claim 23, wherein the control channel information comprises at least one of the following: Broadcast Channel (BCH) information, Master Information Block (MIB) information, a Paging Channel (PCH), downlink common control channel information, downlink dedicated control channel information, self-contained mode information, uplink random access channel information, or uplink control channel information.

25. The terminal according to claim 20, wherein the transceiver is further configured to:
receive a characteristic sequence from the base station, the characteristic sequence being configured to indicate that a channel indicated by the characteristic sequence is a resource indication channel.

26. The terminal according to claim 20, wherein the first time-frequency resource is a time-frequency resource of a cell.

27. The method according to claim 1, wherein the communication parameters comprise information about whether there is a downlink common control channel in the first time-frequency resource.

28. The method according to claim 27, wherein there is the downlink common control channel in the first time-frequency resource, and the communication parameters comprise time-frequency locations for the first time-frequency resource, the time-frequency locations being indicated by an offset relative to the resource indication channel.

29. The method according to claim 1, wherein there is a downlink common control channel in the first time-frequency resource, and the communication parameters comprise time-frequency locations for the first time-frequency resource, the time-frequency locations being indicated by an offset relative to the resource indication channel.

30. The method according to claim 1, wherein transmission of the resource indication channel is performed according to preset parameters.

31. The method according to claim 7, wherein the communication parameters comprise information about whether there is a downlink common control channel in the first time-frequency resource.

32. The method according to claim 31, wherein there is the downlink common control channel in the first time-frequency resource, and the communication parameters comprise time-frequency locations for the first time-frequency resource, the time-frequency locations being indicated by an offset relative to the resource indication channel.

33. The method according to claim 7, wherein there is a downlink common control channel in the first time-frequency resource, and the communication parameters comprise time-frequency locations for the first time-frequency resource, the time-frequency locations being indicated by an offset relative to the resource indication channel.

34. The method according to claim 7, wherein transmission of the resource indication channel is performed according to preset parameters.

35. The base station according to claim 14, wherein the communication parameters comprise information about whether there is a downlink common control channel in the first time-frequency resource.

36. The base station according to claim 35, wherein there is the downlink common control channel in the first time-frequency resource, and the communication parameters comprise time-frequency locations for the first time-frequency resource, the time-frequency locations being indicated by an offset relative to the resource indication channel.

37. The base station according to claim 14, wherein there is a downlink common control channel in the first time-frequency resource, and the communication parameters comprise time-frequency locations for the first time-frequency resource, the time-frequency locations being indicated by an offset relative to the resource indication channel.

38. The base station according to claim 14, wherein transmission of the resource indication channel is performed according to preset parameters.

39. The terminal according to claim 20, wherein the communication parameters comprise information about whether there is a downlink common control channel in the first time-frequency resource.

40. The terminal according to claim 39, wherein there is the downlink common control channel in the first time-frequency resource, and the communication parameters comprise time-frequency locations for the first time-frequency resource, the time-frequency locations being indicated by an offset relative to the resource indication channel.

41. The terminal according to claim 20, wherein there is a downlink common control channel in the first time-frequency resource, and the communication parameters comprise time-frequency locations for the first time-frequency resource, the time-frequency locations being indicated by an offset relative to the resource indication channel.

42. The terminal according to claim 20, wherein transmission of the resource indication channel is performed according to preset parameters.

\* \* \* \* \*